United States Patent [19]

Korinek et al.

[11] Patent Number: 5,732,471
[45] Date of Patent: Mar. 31, 1998

[54] WIRE STRIPPER WITH INTEGRAL CABLE SHEATH CUTTER

[75] Inventors: Chris W. Korinek, Cedarburg; Joseph Kampschroer, Whitefish Bay; Richard Haskey, Milwaukee, all of Wis.

[73] Assignee: Applied Power Inc., Butler, Wis.

[21] Appl. No.: 749,297

[22] Filed: Nov. 14, 1996

[51] Int. Cl.⁶ .................................................. H02G 1/12
[52] U.S. Cl. ............................ 30/90.6; 30/90.4; 81/9.4
[58] Field of Search ........................... 30/90.1, 90.4, 30/90.6, 146, 294; 81/9.4, 9.44

[56] References Cited

U.S. PATENT DOCUMENTS

| 256,700 | 4/1882 | Jincks . | |
|---|---|---|---|
| 1,187,386 | 6/1916 | Pehrson | 30/90.1 |
| 2,398,979 | 2/1946 | Vaughn, Jr. | 30/91 |
| 2,616,172 | 1/1952 | Parker | 30/91 |
| 2,721,384 | 1/1955 | Bell | 30/91 |
| 2,894,424 | 4/1959 | Vaughn, Jr. | 81/9.5 |
| 3,100,935 | 8/1963 | Leafe | 30/294 |
| 3,162,945 | 12/1964 | Stabs | 30/91 |
| 3,818,590 | 6/1974 | Peter et al. | 30/90.4 |
| 3,831,274 | 8/1974 | Horrocks | 30/90.4 |
| 3,902,206 | 9/1975 | Naquin | 30/90.6 |
| 4,083,105 | 4/1978 | ViPond | 30/90.4 |
| 4,198,751 | 4/1980 | Egbert | 30/90.4 |
| 4,433,484 | 2/1984 | Antisdel et al. | 30/90.4 |
| 4,607,544 | 8/1986 | Jewell, Jr. | 30/90.1 |
| 4,997,424 | 3/1991 | Little | 604/280 |
| 5,142,780 | 9/1992 | Brewer | 30/294 |
| 5,330,460 | 7/1994 | Moss et al. | 604/280 |
| 5,359,778 | 11/1994 | Seber et al. | 30/294 |
| 5,535,519 | 7/1996 | Brimmer | 30/90.1 |

FOREIGN PATENT DOCUMENTS

| 343987 | 2/1960 | Switzerland . | |
| 127714 | 10/1960 | U.S.S.R. . | |
| 975476 | 11/1964 | United Kingdom | 30/90.6 |

OTHER PUBLICATIONS

GB Electrical Inc. Catalog, copyright 1992, pp. 112–114.

*Primary Examiner*—Hwei-Siu Payer
*Attorney, Agent, or Firm*—Quarles & Brady

[57] ABSTRACT

A tool for removing insulation from an electrical cable, has a pair of levers pivotally joined at a fulcrum point to each other. Each lever has a handle and a jaw on opposite sides of the fulcrum point. The jaws have a plurality of notches of different curvatures which come together in a closed state for stripping insulation from electrical wires of different gauges. One of the jaws also contains a ripper for cutting away the sheathing from an electrical cable. The ripper is formed by a ripper notch with first and second sides that diverge at an acute angle from a vertex to an opening that faces away from the handles. The first side of the ripper notch has a beveled surface which forms a sharp knife edge that cuts the sheathing and the second side is formed by a cylindrical guide pin. When the tool is used, the guide pin is inserted into the end of the cable and directs the sheathing into the ripper notch while preventing the insulated wires within the cable from being damaged by the knife edge. A retractable guard is provided to protect against the ripper notch damaging objects when not being used to cut cable sheathing.

9 Claims, 2 Drawing Sheets

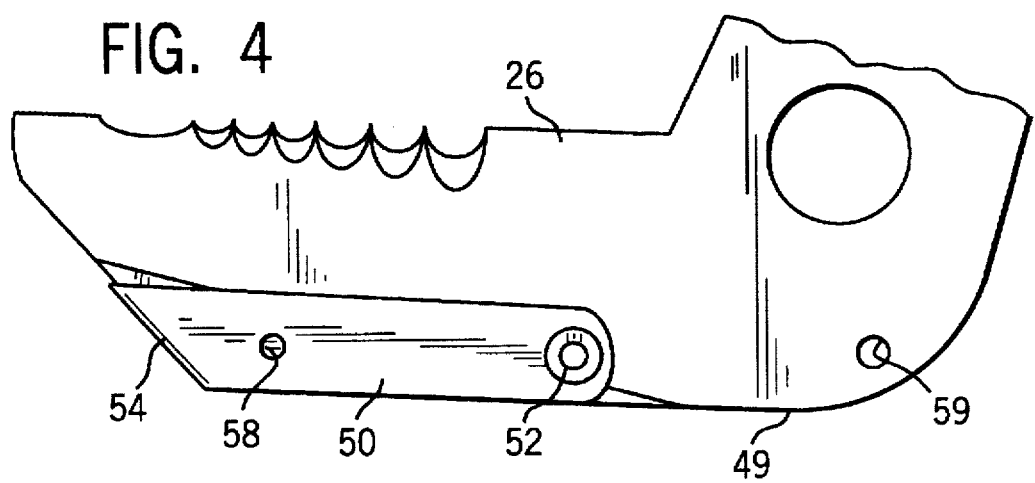
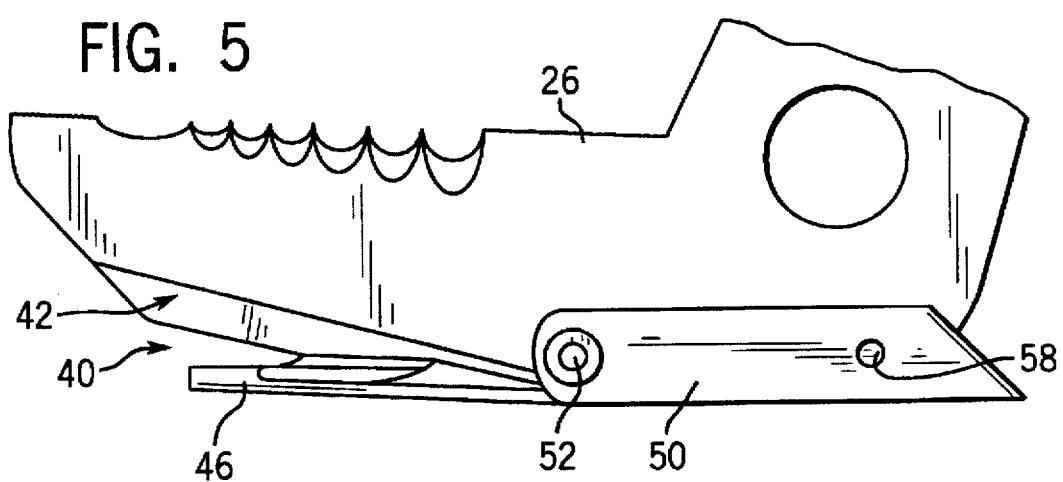
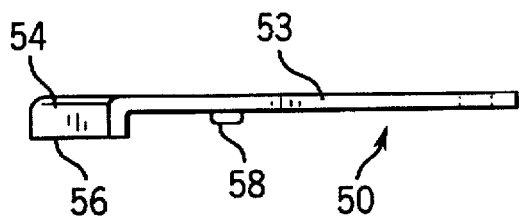

WIRE STRIPPER WITH INTEGRAL CABLE SHEATH CUTTER

BACKGROUND OF THE INVENTION

The present invention relates to tools for cutting insulation from electrical cables; and more particularly to devices for cutting the sheathing of multiple conductor electric cables.

Residential electrical wiring commonly utilizes a cable with plastic, or non-metallic, sheathing that surrounds two or three insulated wires and a bare ground conductor. In order for an electrician to connect a switch, receptacle or light fixture to the cable, the metal conductors within the insulated wires have to be exposed at one end of the cable. To do so the electrician must first cut away several inches the plastic sheathing at the end of the cable. A short length of the insulation then is removed from around each end of the conductors.

Numerous tools have been developed for slitting and stripping these electrical cables. The simplest tool is a knife with which the electrician makes an annular cut in the sheathing. The end portion of the sheathing then is pulled away exposing the individually insulated wires and the bare ground wire. The knife may also be used to cut away a short portion of the insulation at the ends of the wires. During both operations the electrician has to be extremely careful, or else the knife blade may damage the insulation around the internal wires and even nick the conductor.

As an alternative to using a knife, various scissors-like wire strippers have been developed. Such devices have elongated opposing jaws with a series of semi-circular notches spaced along the length of both jaws. Each notch is tapered to provide a sharp semi-circular edge for cutting into the insulation around a conductor. The radii of each pair of opposing notches corresponds different gauges of the solid conductors used in electrical wiring. In order to strip insulation from an individually insulated wire, the wire is placed into the openings of the notches in the opposing jaws which corresponds to the gauge of the conductor within the wire. Then the handles of the stripper are squeezed together forcing the jaws into the insulation until the jaws are fully closed. In this position, the jaws have pierced the insulation, but have not cut into the internal conductor. The conductor of the wire then is pulled through the closed jaws of the stripper removing the insulation from the conductor. Although such scissors-like wire strippers are effective for removing the insulation from individual wires within an electrical cable, they are not efficient for removing the sheathing from the end of the cable in order to expose the individually insulated wires.

It is desirable to provide a single tool which can be utilized both to strip away the outer sheathing of an electrical cable and also remove the insulation from around the individual internal conductors.

SUMMARY OF THE INVENTION

A general object of the present invention is to provide a tool for rapidly and efficiently removing insulation from an electrical cable.

Another object is to provide a tool for efficiently removing the insulative sheathing from around individually insulated wires within the electrical cable.

A further object is to provide a single tool that can be utilized for removing both the sheathing and the insulation from individual wires of a multi-conductor electric cable.

These objects and others are satisfied by a tool which has first and second levers pivotally jointed in a scissors-like manner. The first lever has a first handle, a first jaw and a first intermediate portion between the first handle and the first jaw. The first jaw possesses a first surface with a plurality of notches of different curvatures for stripping insulation from electrical wires of different gauges. The second lever is of similar design and includes a second handle, a second jaw and a second intermediate portion therebetween. The second jaw also has a second surface with a plurality of notches of different curvatures corresponding to the opposing notches in the first jaw. A pivot couples the first and second intermediate portions thereby enabling the first and second surfaces alternately to be brought into and away from abutment.

The second lever includes a ripper notch for cutting sheathing of an electric cable wherein the ripper notch has first and second sides which diverge at an acute angle from a vertex to an opening that faces away from the second handle. The first side of the notch is formed by a bevelled third surface of the second jaw, and the second side is formed by a cylindrical guide pin which projects from the third surface.

Yet another object of the present invention is to provide a sheathing removal tool which incorporates a protective guard to prevent injury to the user. As a consequence, the preferred embodiment of the tool has a guard pivotally attached to the second jaw. The guard can be moved into a first position where it extends over the ripping notch, thereby inhibiting objects from entering the ripper notch. In a second position the guard is retracted from the ripper notch. A dimple on the guard extends between the first and second sides to hold the guard over the ripper notch in the first position. In the second position, the dimple extends into a recess in the second lever to hold the guard retracted from the ripper notch.

BRIEF DESCRIPTION OF THE DRAWINGS

FIG. 4 is a partially cut away side view of another embodiment of the tool jaw with a protective guard in place over the cutting surfaces;

FIG. 5 is a view of the jaw with the guard in a retracted position; and

FIG. 6 is a bottom view of the guard.

DETAILED DESCRIPTION OF THE INVENTION

Figure 1:
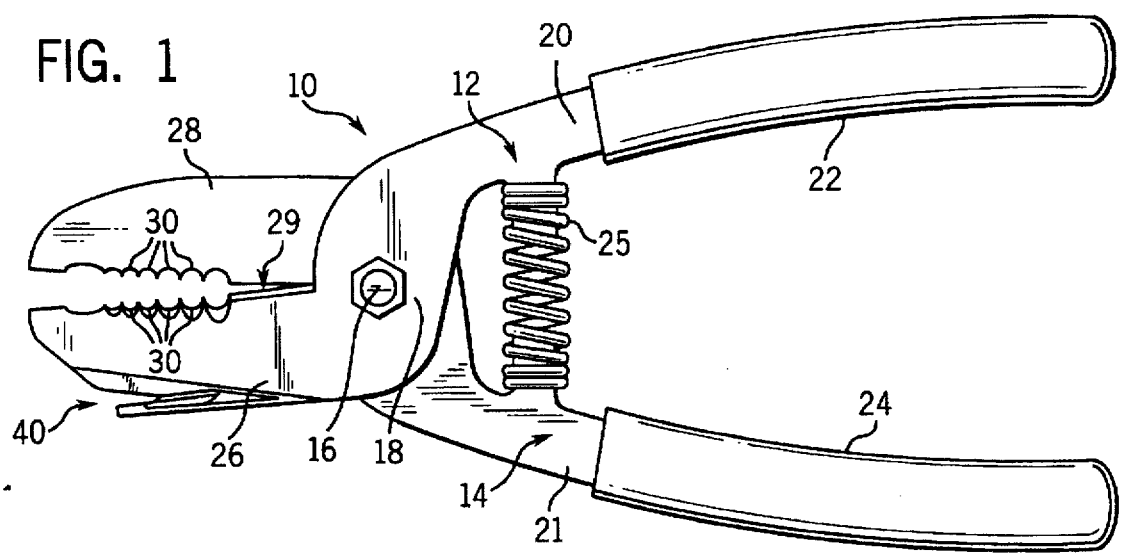
FIG. 1 is a side view of a tool according to the present invention for removing insulation from electrical wires.

With initial reference to FIG. 1, a wire stripper 10 comprises a pair of levers 12 and 14 pivotally connected to one another by a bolt and nut collectively designated 16 extending through holes in each lever. The levers 12 and 14 have a generally Z shape with an intermediate portion 18 from which a handle 20 and 21 extends in one direction. The handles 20 and 21 are covered by plastic grips 22 and 24 respectively. Each lever 12 and 14 has a jaw 26 and 28 extending in the opposite direction from the handles. The jaws 26 and 28 have a pair of facing surfaces within which a set of semi-circular notches 30 are cut at different radii which correspond to different gauges of wires to be stripped. The jaw surface is tapered around each notch 30 to form sharp edges for biting into the wire insulation. The edge of each jaw 26 and 28 between the set of notches 30 and the intermediate lever portion 18 are bevelled to a sharp edge thereby forming a scissor section 29 of the tool 10. A spring 25 extends between tabs on each handle 21 and 20 to bias the levers so that the jaws normally are spread apart for receiving wires to be stripped.

Figure 2:
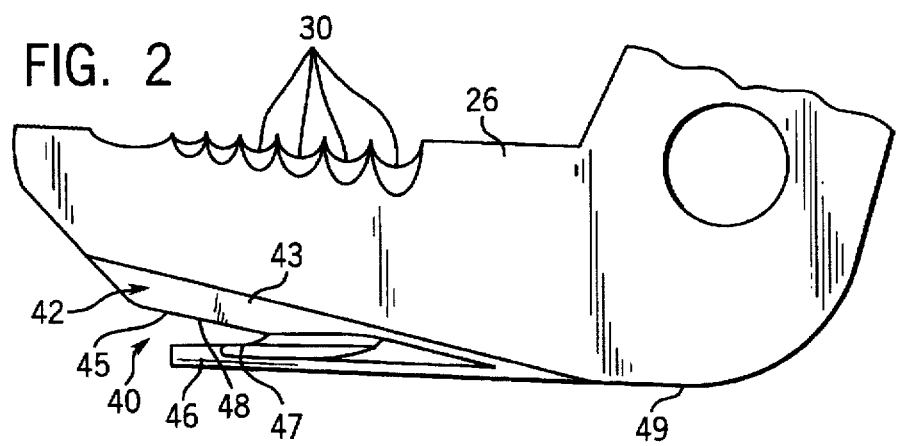
FIG. 2 is an enlarged cut-away view of a jaw of the tool in FIG. 1.
Figure 3:
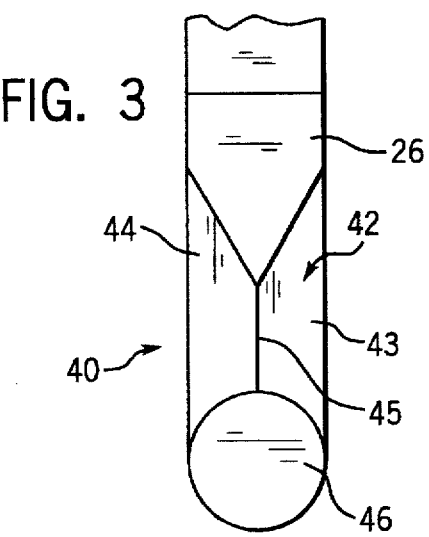
FIG. 3 is a front end view of the jaw in FIG. 2.

One of the jaws 26 includes a ripper 40 for removing the sheathing of a plastic insulated electrical cable. With detailed reference to FIGS. 2 and 3, the ripper 40 includes a blade 42 formed along an outer edge of this jaw 26 by beveled surfaces 43 and 44 which meet at a sharp knife edge 45. A cylindrical guide pin 46 projects at an acute angle with respect to the blade 42 forming a V-shaped ripper notch 48 therebetween. The cross section of the cylindrical guide pin 46 may be oval, circular or rectangular with rounded edges. The sides of ripper notch 48 are bevelled to sharp edges immediately adjacent the vertex 47. Preferably the pin 46 is tangential to the outer edge 49 of intermediate portion 18 of the lever 20 which includes jaw 26. Thus a straight line exists along the outer edge of the jaw and intermediate portion making it relatively easy to insert the closed tool into a pocket. Although not shown in the drawings, a locking mechanism may be provided to maintain the jaws 26 and 28 in a closed state when the wire stripper 10 is not in use.

The present wire stripper 10 may be used effectively with different forms of plastic insulated electrical cable, such as the common oval, round and large diameter varieties. When using the wire stripper 10, the electrician inserts the exposed tip of the guide pin 46 into the end of the cable between the plastic sheathing and the internal wires. The relatively small tip and curved surface of the cylindrical guide pin 42 facilitate easy insertion. The cable is gripped with one hand and the wire stripper 10 with the other hand. The electrician then pushes the ripper 10 into the cable so that the guide pin 42 enters farther into the sheathing. This action causes the end of the sheathing to come into contact with the sharp edges at the vertex 47 of the ripper notch 48. Further pushing of the ripper 40 into the cable causes the sharp edge 45 to begin cutting the sheathing. The guide pin 46 prevents the knife edge 48 from contacting the individually insulated wires and protects the insulation and conductors of those wires from being damaged by the sharp knife blade 42. The electrician continues pushing the ripper 40 lengthwise through the cable until a slit of the desired length has been formed. Alternatively, the electrician can use the tip of the guide pin 46 to pierce the sheathing a desired distance from the end of the cable and push the stripper 10 toward that end. However with this latter technique, care must be taken not to pierce the insulation of the internal wires of the cable during insertion of the tip.

At this point, the ripper 40 can be removed from the cable and inserted transversely into the closed end of the slit that has just been formed along the length of the cable. The tool then is moved in a curving fashion around the cable to produce a transverse slit in the sheathing which severs the end portion of the sheathing from the cable. Alternatively, the section 29 of the stripper jaws 26 and 28 can be used as a scissors to cut away the slit portion of the sheathing.

A common use of the tool is to remove the sheathing from a cable that has been inserted through a hole in an electrical junction box. In this application, the ripper 10 is pushed along the cable until the jaw 26 strikes the interior surface of the electrical box. Thereafter the electrician pulls on the slit portion of the sheathing until the portion tears away from the cable. Thus the present tool 10 enables the sheathing to be removed from the entire section of the cable that is within the electrical box. This is in contrast to previous stripper knives which had a U-shaped blade which was pulled, not pushed, along the cable and thus could not enter the electrical box completely enough to strip the sheathing all the way to the internal strain relief in the box.

Once the sheathing has been removed from the end portion of the cable, the insulation from each of the individual wires is removed utilizing the notches 30 on the opposing surfaces of the jaws 26 and 28, as previously described. Thus the present wire stripping tool 10 provides cooperating elements 30 and 40 which are used to both remove the outer sheathing from the cable and the internal insulation from around the individual wires.

One of the problems which may be encountered when using the wire stripping tool 10 shown in FIG. 1 is that the user may inadvertently catch the edge of clothing in the V-shaped notch 48 of the ripper 40. This can result in the clothing being cut in the same manner as the wire insulation. In addition although the guide pin 46 has a rounded tip, the guide pin still can poke the user. In order to avoid such accidents from occurring, the jaw 26 preferably has a guard 50 as shown in FIG. 4. The guard 50 is attached by a rivet 52 that loosely passes through a hole in the jaw 26 so that the guard may be rotated thereabout. In the illustrated closed position, the guard extends over the blade 42 and guide pin 46. With further reference to FIG. 6, the guard 50 is formed by a strip of sheet metal 53 having an angular edge 54 bent to form a protecting tab 56. In the closed state of the guard 50, the tab 56 extends around the open end of the ripper notch 48 preventing objects from entering the notch. The guard 50 has a dimple 58 which extends into the ripper notch 48 between the blade 42 and guide pin 46 to hold the guard in the closed state. However, the user is able to flex the guard 50 slightly when pivoting so that the dimple 58 is able to pass over the guide pin When the ripper 40 is being used, the guard 50 is in the retracted state shown in FIG. 5. Now the ripper 40 is exposed by the guard being pivoted 180 degrees into a position against the outer edge 49 of the lever 20. The lever 20 has a hole or depression 59, shown in FIG. 4, within which the dimple 58 fits to hold the guard 50 in the retracted position while the ripper 40 is being used. The flexibility of the guard 50 enables the dimple 58 to pass into and out of the hole or depression 59. Alternatively the curved edge of the lever 20 could have a notch for receiving the guard dimple 58. The hole, depression and notch are collectively referred to herein as a recess in the lever.

We claim:

1. A tool for removing insulation from an electrical cable, said tool comprising:

a first lever including a first handle portion, a first jaw and a first intermediate portion between the first handle portion and the first jaw, the first jaw having a first surface with a plurality of notches of different curvatures for stripping insulation from electrical wires of different gauges; and a second lever including a second handle portion, a second jaw and a second intermediate portion between the second handle portion and the second jaw, the second jaw having a second surface with a plurality of notches of different curvatures for stripping insulation from electrical wires of different gauges, and wherein the first and second intermediate portions are pivotally connected together enabling the first and second surfaces to be moved alternately toward and away from each other, and the second lever having a ripper notch for cutting sheathing of an electric cable wherein the ripper notch has first and second sides which diverge at an acute angle from a vertex to an opening that faces away from the second handle portion, the first side being formed by a third surface of the second jaw and the second side formed by a guide pin which projects from the third surface.

2. The tool as recited in claim 1 wherein the guide pin has a cylindrical shape.

3. The tool as recited in claim 1 wherein the third surface of the second jaw is bevelled to form an edge for cutting the sheathing.

4. The tool as recited in claim 1 wherein portions of the first and second sides which are adjacent to the vertex are bevelled to form edges for cutting the sheathing.

5. The tool as recited in claim 1 further comprising a guard attached to the second lever, said guard having a first position extending over the ripper notch thereby inhibiting object from entering the ripper notch, and having a second position retracted from the ripper notch.

6. The tool as recited in claim 5 wherein the guard has a dimple which in the first position extends between the first and second sides to hold the guard over the ripper notch, and which in the second position extends into a recess in the second lever to hold the guard retracted from the ripper notch.

7. A tool for removing insulation from an electrical cable, said tool comprising:

first and second levers joined to pivot with respect to each other about an axis, each of the first and second levers includes a handle on one side of the axis and a jaw on the other side of the axis, each jaw having a plurality of notches of different curvatures for stripping insulation from electrical wires of different gauges; and the jaw of the first lever further including a ripper notch for cutting sheathing of an electric cable, wherein the ripper notch has first and second sides which diverge from a vertex to an opening that faces away from the handle of the first lever, the first side having bevelled surface which forms a knife edge and the second side being formed by a cylindrical guide pin.

8. The tool as recited in claim 7 further comprising a guard pivotally attached to the first lever, said guard having a first position extending over the ripper notch thereby inhibiting object from entering the ripper notch, and having a second position retracted from the ripper notch.

9. The tool as recited in claim 8 wherein the guard has a dimple which in the first position extends between the first and second sides to hold the guard over the ripper notch, and which in the second position extends into a recess in the first lever to hold the guard retracted from the ripper notch.

* * * * *